Nov. 27, 1928.
H. E. WANER
1,693,264
METHOD OF VULCANIZING SUCCESSIVE SEPARATE ARTICLES AND APPARATUS THEREFOR
Filed Dec. 3, 1926
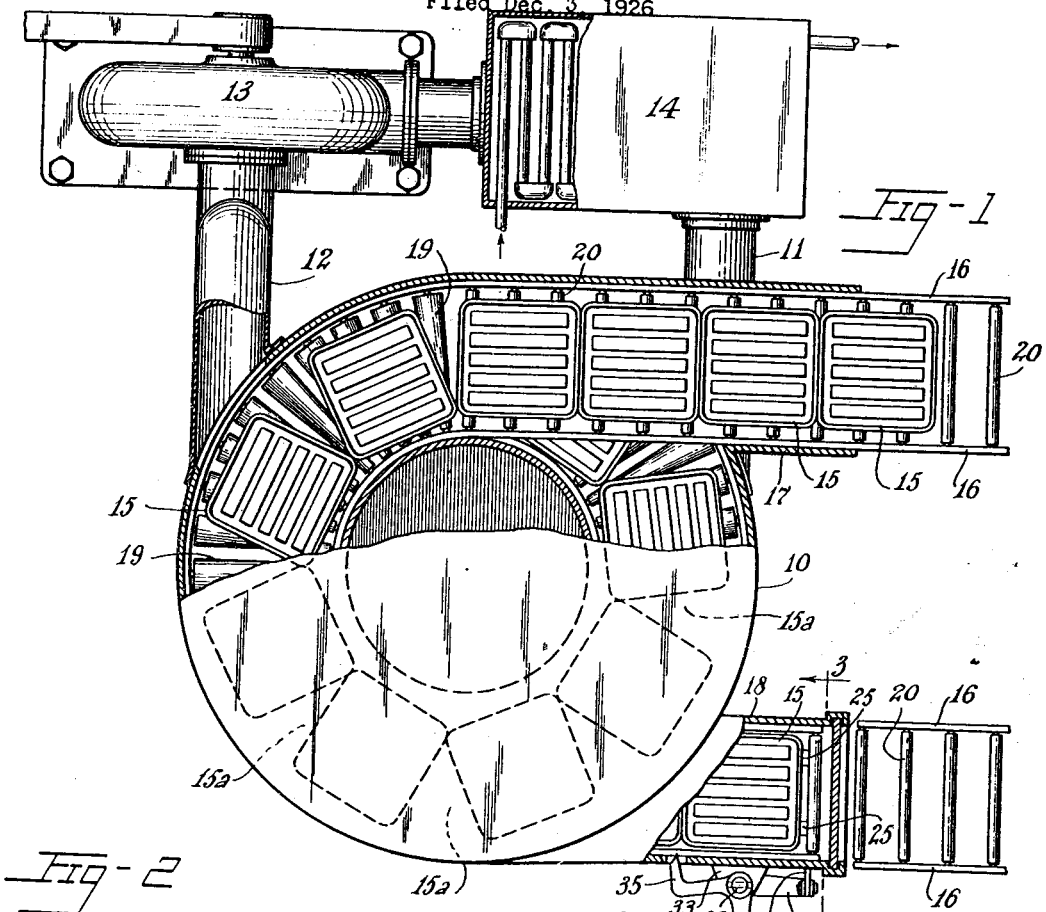
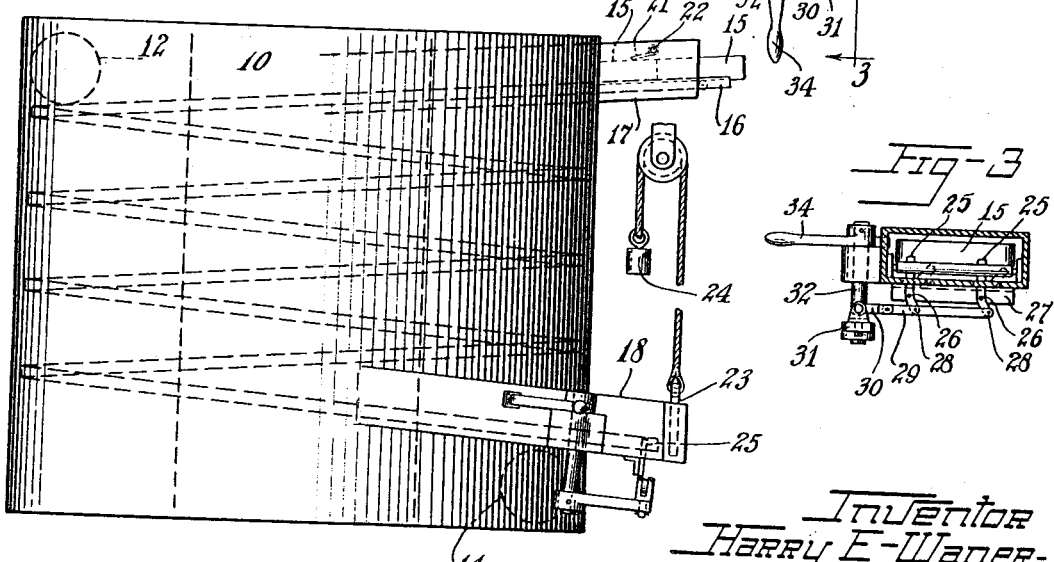
Inventor
Harry E. Waner
By Pinson, Eakin & Avery
Attys.

Patented Nov. 27, 1928.

1,693,264

UNITED STATES PATENT OFFICE.

HARRY E. WANER, OF AKRON, OHIO, ASSIGNOR TO THE B. F. GOODRICH COMPANY, OF NEW YORK, N. Y., A CORPORATION OF NEW YORK.

METHOD OF VULCANIZING SUCCESSIVE SEPARATE ARTICLES AND APPARATUS THEREFOR.

Application filed December 3, 1926. Serial No. 152,351.

This invention relates to vulcanizing procedure and apparatus and especially apparatus wherein articles to be vulcanized are passed through a vulcanizing chamber in procession.

My chief objects are to provide for economy of space in the vulcanizing chamber; to avoid the necessity of discontinuing the vulcanizing operation for emptying and filling the vulcanizer; to provide for uniformity of the vulcanizing period and of the conditions of vulcanization for successive articles; to avoid waste of vulcanizing fluid; to provide effective circulation of the vulcanizing medium; to provide simplicity and economy of construction; and to provide facility of operation.

Of the accompanying drawings:

Fig. 1 is a plan view, with parts sectioned and broken away, of apparatus embodying and adapted to carry out my invention in its preferred form.

Fig. 2 is a side elevation of the same.

Fig. 3 is a section on line 3—3 of Fig. 1.

Referring to the drawings, the apparatus comprises a vertical, annular vulcanizing chamber 10 having an inlet pipe 11, preferably near its bottom, and an outlet pipe 12, preferably near its top, by which the vulcanizing chamber is connected in a substantially closed circuit with a blower 13 and a heater 14, for heating and circulating through the chamber a heating fluid such as air or an inert gas.

Mounted within the vulcanizing chamber is a helical gravity conveyor, preferably of the roller type, for a procession of molds or vulcanizing trays 15, 15, the conveyor comprising a pair of side frames 16, 16 which extend from a straight reach into the vulcanizer through an inlet spout 17 near the top of the apparatus and extend in a straight reach from the interior of the vulcanizer near the bottom thereof through an outlet spout 18, the portions of the side frames within the vulcanizer being helically disposed and secured to the inner and outer walls respectively of the annular vulcanizing chamber. The rollers 19, 19 of the conveyor, mounted in the curved portions of the side frames, are preferably of tapered form, to permit free running of the articles conveyed, while the rollers 20, 20 of the straight reaches are cylindrical. The molds or trays 15 are preferably so formed as to provide open spaces 15ª, 15ª between them, for effective circulation of fluid.

To avoid excessive escape of the vulcanizing fluid through the inlet spout when the latter is not occupied by a mold a hanging door 21 (Fig. 2) is hinged at 22 to close the passage at such times.

To avoid such escape through the outlet spout 18 the spout is formed with guide-ways for a lifting door 23 provided with a counter-weight 24.

For effecting the removal of the molds singly from the vulcanizer an escapement device is provided which comprises a pair of stop arms 25, 25 pivoted at 26, 26 on a bracket 27 secured to the under face of the spout, the stop arms extending into the spout through slots in the floor thereof at a position between the adjacent rollers 20 of the conveyor and the lower ends of each of the arms being pivoted at 28, 28 to a bar 29 which is connected by a link 30 with a horizontal arm 31 projecting from a vertical shaft 32 journaled in a bracket 33 secured to the side of the spout, the stop arms 25 being adapted to be turned on their pivots, by rotation of the shaft 32, to raise their upper ends above the adjacent rollers 20, as shown in full lines in Fig. 3, to serve as stops for the adjacent mold 15, or to swing them down to the dotted-line positions there shown and thus permit the mold to pass.

For so turning the shaft 32 and for stopping the next following mold and those behind it while the leading mold passes from the spout a hand lever 34 is secured on the upper end of the shaft and formed integrally with its hub is an L-shaped detent arm 35 whose outer, laterally-projecting portion is tapered at its end and is adapted to enter between the leading mold and the one next after it when the lever is turned to release the leading mold, and to be withdrawn to release the procession of molds when the lever is turned in the opposite direction to restore the stop arms 25 to their stopping position, in which they then stop the procession of molds when the latter has advanced a distance equal to the length of a mold.

In the operation of the apparatus, vulcanizing fluid being circulated through the chamber by the blower 13 and heated to vulcanizing temperature by the heater 14, the molds 15 are introduced into the chamber at suitable intervals of time through the chute 17 and as soon as the first mold has been in the chamber for a suitable length of time for the vulcanization of the articles contained in it the molds in succession are removed through the spout 18 at like intervals of time, so that the operation becomes a continuous one.

The helical conveyor serves as a baffle to cause a desirable flow of the heating fluid about the molds and the annular form of the chamber provides economy of vulcanizing fluids and effective heating of the molds, and, the molds being so formed as to provide the open spaces 15ª, 15ª between them, the heating fluid circulates about all sides of them, with consequent effectiveness and evenness of heating.

Modifications are possible within the scope of my invention as defined in the appended claims.

I claim:

1. The method of vulcanizing successive, separate articles which comprises passing them in procession through a helical path while circulating a heating fluid about and through the procession.

2. The method of vulcanizing successive, separate articles which comprises passing them by gravity through a helical path while circulating a heating fluid about them.

3. Vulcanizing apparatus comprising means for effecting movement of successive separate articles in procession through a helical path with open spaces in the procession and means for circulating a heating fluid about the articles and through said open spaces.

4. Vulcanizing apparatus comprising a chamber, a circuitous gravity conveyor in said chamber, and means for heating the interior of the chamber.

5. Vulcanizing apparatus comprising a chamber, a roller type gravity conveyor therein, and means for circulating a heating fluid in the chamber.

6. Vulcanizing apparatus comprising a vertical, annular chamber, means for heating the same, and means for passing a succession of separate articles in a helical path through the chamber.

In witness whereof I have hereunto set my hand this 13th day of November, 1926.

HARRY E. WANER.